US011359793B2

(12) United States Patent
Yamamoto

(10) Patent No.: US 11,359,793 B2
(45) Date of Patent: Jun. 14, 2022

(54) LIGHTING APPARATUS AND PROJECTION-TYPE IMAGE DISPLAY APPARATUS

(71) Applicant: Panasonic Intellectual Property Management Co., Ltd., Osaka (JP)

(72) Inventor: Norikazu Yamamoto, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/494,166

(22) Filed: Oct. 5, 2021

(65) Prior Publication Data

US 2022/0026045 A1 Jan. 27, 2022

Related U.S. Application Data

(62) Division of application No. 16/665,552, filed on Oct. 28, 2019, now Pat. No. 11,168,867.

(30) Foreign Application Priority Data

Oct. 30, 2018 (JP) .................................. 2018-204060

(51) Int. Cl.
*F21V 9/14* (2006.01)
*G11B 7/1362* (2012.01)
(Continued)

(52) U.S. Cl.
CPC .............. *F21V 9/14* (2013.01); *G02B 5/0284* (2013.01); *G02B 27/0955* (2013.01);
(Continued)

(58) Field of Classification Search
CPC ....... F21V 9/14; G02B 5/0284; G02B 26/008; G02B 27/0955; G02B 27/141;
(Continued)

(56) References Cited

U.S. PATENT DOCUMENTS 9,366,413 B2 6/2016 Rehn
10,831,086 B2* 11/2020 Ohkoba ............. G03B 21/2073
(Continued)

FOREIGN PATENT DOCUMENTS

CN 101846250 9/2010
JP 4-254851 9/1992
(Continued)

OTHER PUBLICATIONS

Office Action dated Mar. 2, 2022 in corresponding Chinese Patent Application No. 201911041245.8, with English language translation.

*Primary Examiner* — Jason M Han
(74) *Attorney, Agent, or Firm* — Wenderoth, Lind & Ponack, L.L.P.

(57) ABSTRACT

A lighting apparatus includes: a light source generating a first color component light; a separation element partially transmitting the first color component light, partially reflecting the first color component light, and transmitting a second color component light different from the first color component light at a certain moment; an illuminant excited by the first color component light transmitted through the separation element to generate the second color component light; and an optical system combining the first color component light made incident on the separation element from the light source and reflected by the separation element with the second color component light made incident on the separation element from the illuminant and transmitted through the separation element. The separation element is configured to have variable transmittance and reflectance with respect to the first color component light.

6 Claims, 15 Drawing Sheets

(51) Int. Cl.
- *G11B 7/1356* (2012.01)
- *H04N 9/31* (2006.01)
- *G02B 27/14* (2006.01)
- *G02B 27/09* (2006.01)
- *G02B 5/02* (2006.01)
- *G03B 21/20* (2006.01)

(52) U.S. Cl.
CPC ......... *G02B 27/141* (2013.01); *G03B 21/204* (2013.01); *G11B 7/1356* (2013.01); *G11B 7/1362* (2013.01); *H04N 9/3158* (2013.01)

(58) Field of Classification Search
CPC .............. G03B 21/2013; G03B 21/204; G03B 21/2073; G11B 7/1356; G11B 7/1362; H04V 9/3111; H04V 9/3158; H04V 9/3164

See application file for complete search history.

(56) References Cited

U.S. PATENT DOCUMENTS

| | | |
|---|---|---|
| 2006/0028960 A1 | 2/2006 | Hatano et al. |
| 2010/0245776 A1 | 9/2010 | Yamamoto |
| 2015/0222864 A1 | 8/2015 | Inoko |
| 2016/0373705 A1 | 12/2016 | Hashizume |

FOREIGN PATENT DOCUMENTS

| | | |
|---|---|---|
| JP | 2000-206464 | 7/2000 |
| JP | 2006-73171 | 3/2006 |
| JP | 2012-118129 | 6/2012 |
| JP | 2015-163947 | 9/2015 |
| JP | 2017-9690 | 1/2017 |
| JP | 2017-147420 | 8/2017 |
| JP | 2018-13662 | 1/2018 |
| JP | 2018-54667 | 4/2018 |

* cited by examiner

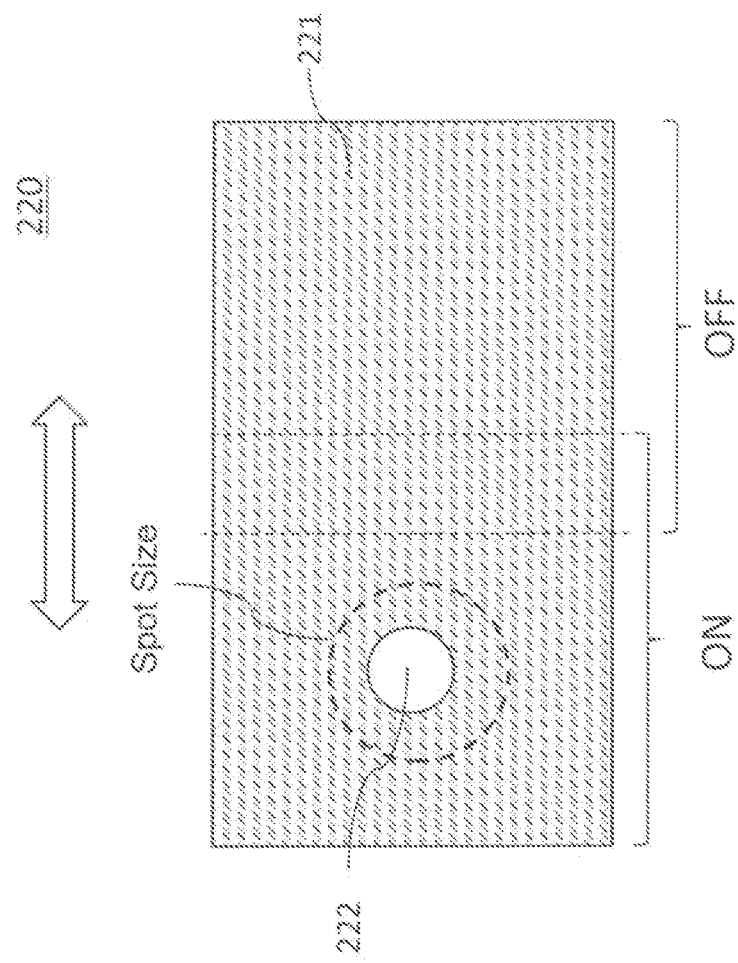

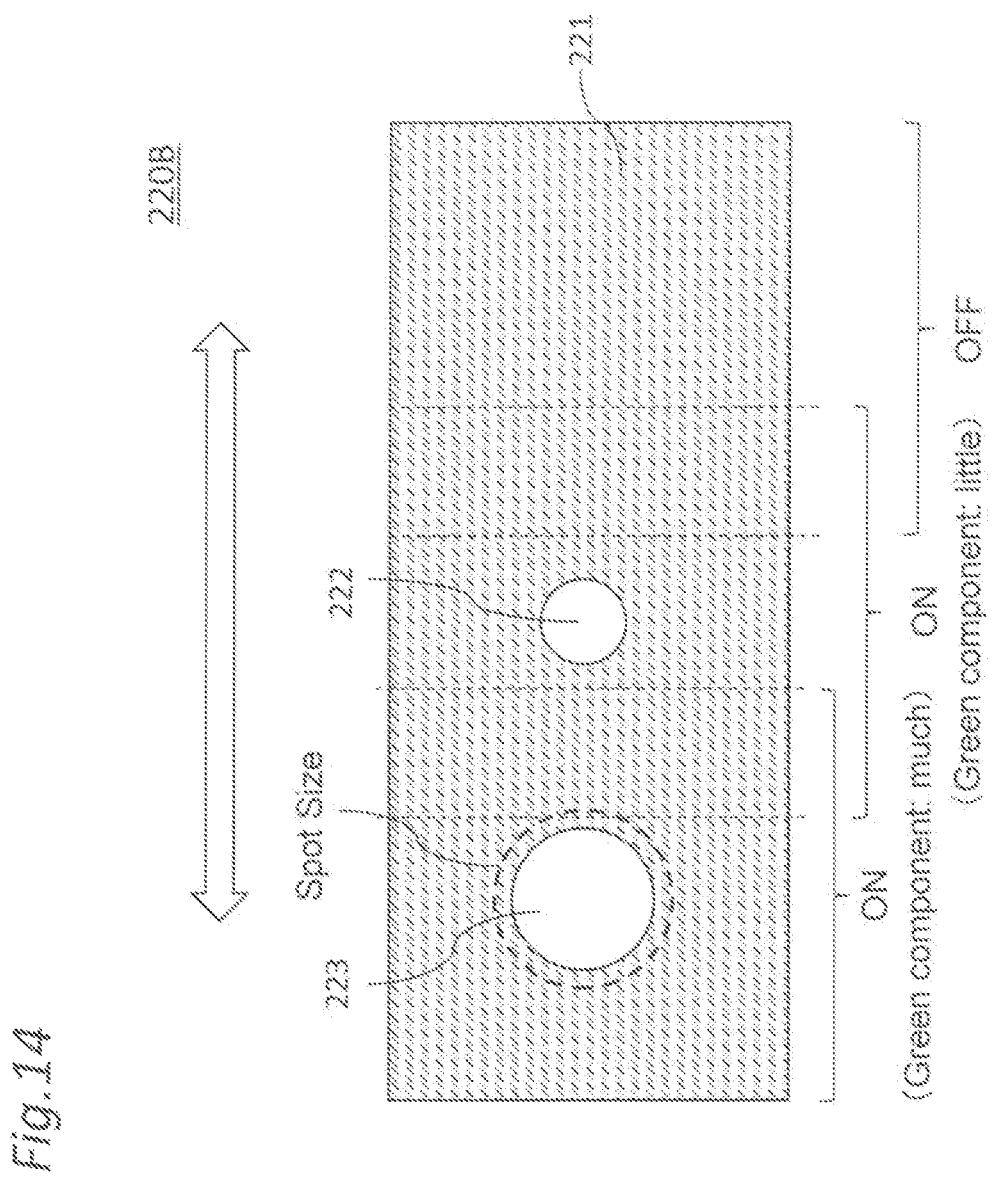

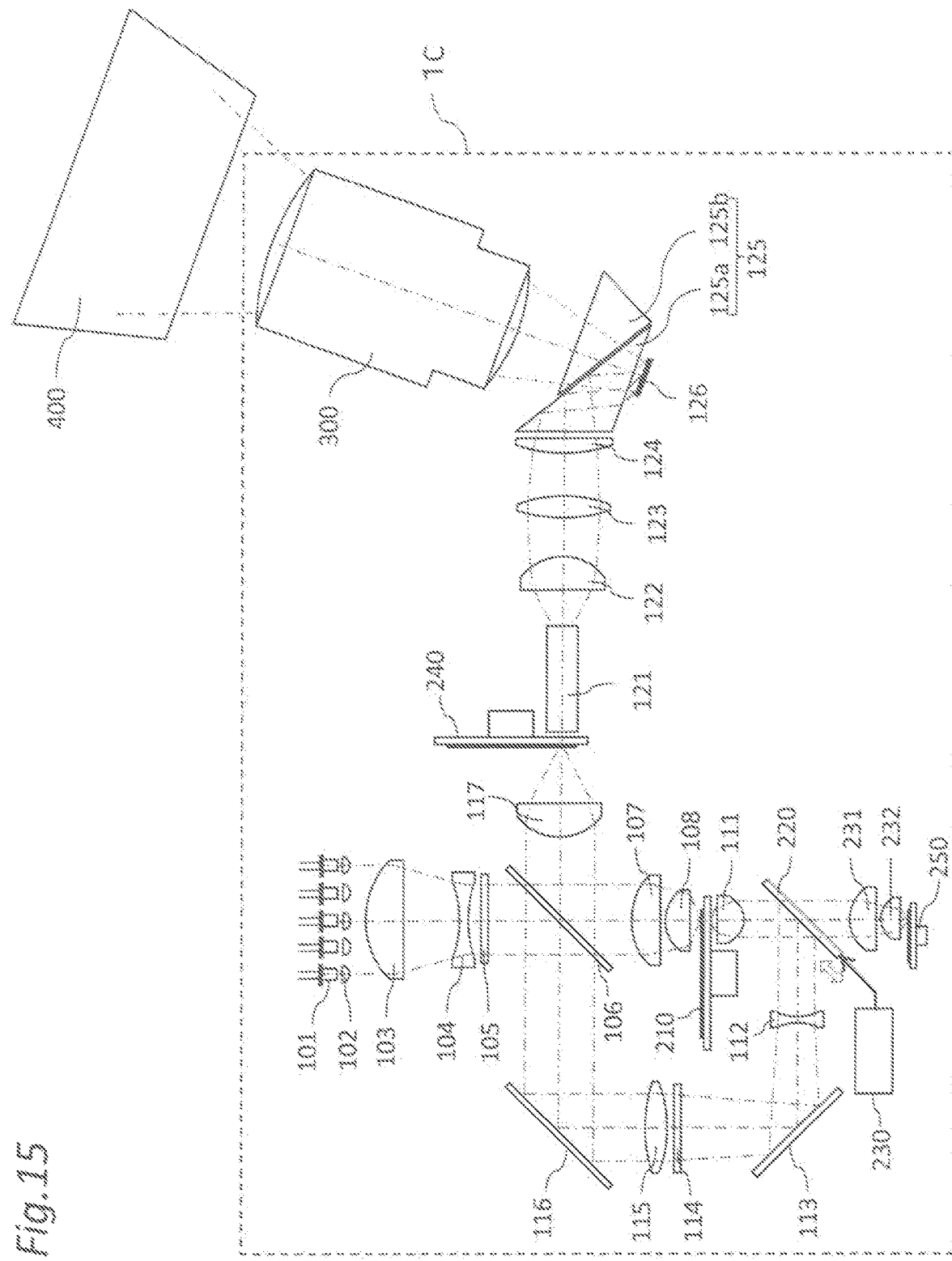

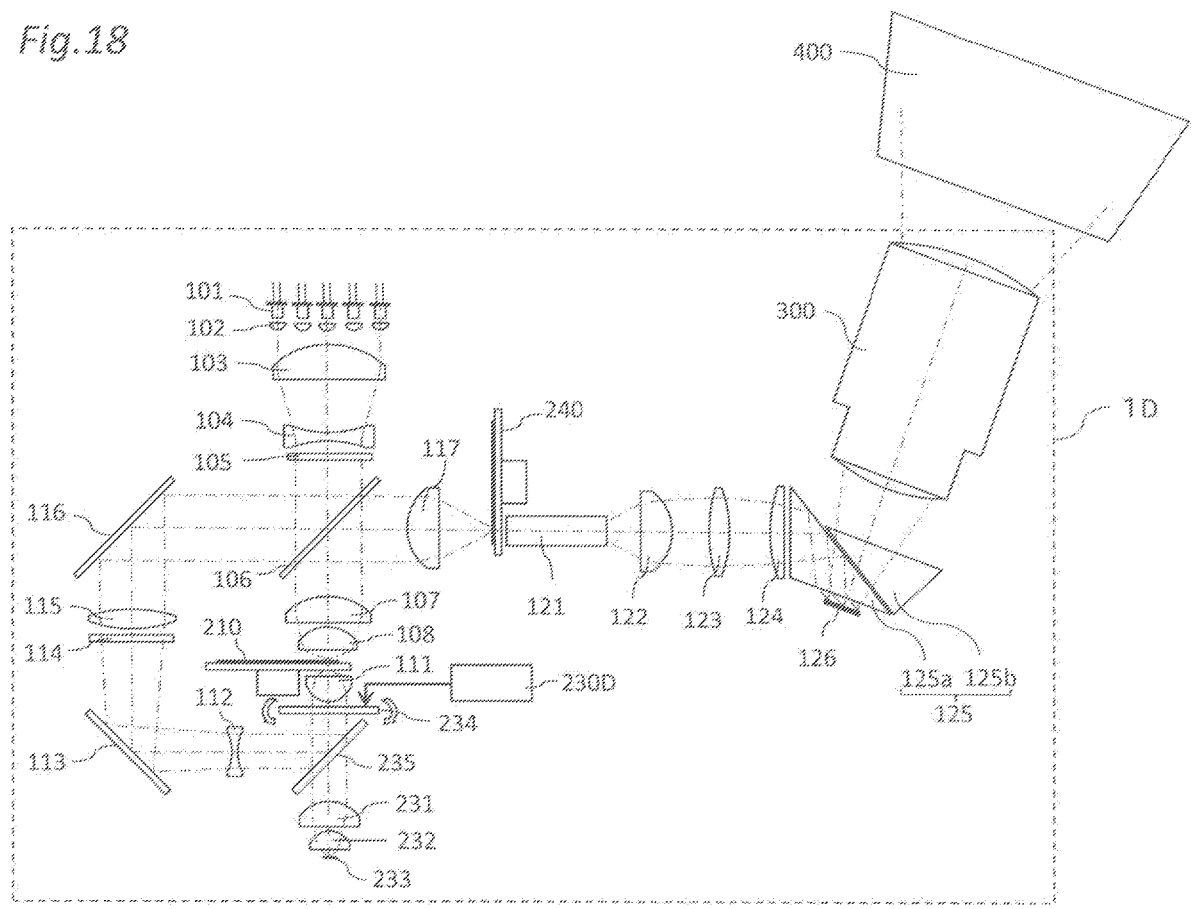

US 11,359,793 B2

LIGHTING APPARATUS AND PROJECTION-TYPE IMAGE DISPLAY APPARATUS

BACKGROUND

1. Technical Field

The present disclosure relates to a lighting apparatus generating an illumination light for a light modulation element etc. of a projection-type image display apparatus and also relates to a projection-type image display apparatus including such a lighting apparatus.

2. Related Art

Projection-type image display apparatuses are widely used for projecting images on large screens in movies and conference presentations. The projection-type image display apparatuses can project a distortion-free image focused even in the periphery, mainly on a substantially flat white projection surface.

A high light intensity white lamp light source such as a xenon lamp and an extra high-pressure mercury lamp has been conventionally used as a light source of a projection-type image display apparatus. However, the lamp light source must be replaced every few thousand hours due to service life and becomes completely unable to display an image in the worst case when reaching the end of the service life, therefore having a problem in maintainability during long-term use.

Solid-state light source elements such as light emitting diodes and laser diodes having a longer service life are used instead of the lamp light source in recently developed lighting apparatuses and projection-type image display apparatuses. The solid-state light source elements reduce the frequency of, or eliminate the need for, the replacement and therefore significantly improve the maintainability. Additionally, due to the narrow spectral distribution characteristics of the solid-state light source element, a projection-type image display apparatus having a wide color gamut can be achieved. Particularly, when a laser diode is used as a light source, a light utilization efficiency can be improved due to smaller spread of the light from the light source. A projection-type image display apparatus including a blue laser diode and a phosphor is also provided, and when luminance is particularly required, a blue light is applied to the phosphor to generate another color component light.

SUMMARY

An object of the present disclosure is to provide a lighting apparatus and a projection-type image display apparatus capable of selectively improving a spectral characteristic of a certain color component light with a simple configuration without requiring significant changes in configurations of existing illumination and projection-type image display apparatuses.

A lighting apparatus according to an aspect of the present disclosure includes: a light source generating a first color component light; a separation element partially transmitting the first color component light, partially reflecting the first color component light, and transmitting a second color component light different from the first color component light at a certain moment; an illuminant excited by the first color component light transmitted through the separation element to generate the second color component light; and an optical system combining the first color component light made incident on the separation element from the light source and reflected by the separation element with the second color component light made incident on the separation element from the illuminant and transmitted through the separation element. The separation element is configured to have variable transmittance and reflectance with respect to the first color component light.

The lighting apparatus and the projection-type image display apparatus according to an aspect of the present disclosure can selectively improve a spectral characteristic of a certain color component light with a simple configuration without requiring significant changes in configurations of existing illumination and projection-type image display apparatuses.

BRIEF DESCRIPTION OF THE DRAWINGS

FIG. 5 is a schematic diagram showing an exemplary configuration of a dichroic mirror 220 of FIG. 1;

FIG. 14 is a schematic diagram showing an exemplary configuration of a dichroic mirror 220B according to a first modification of the first embodiment.

FIG. 15 is a schematic diagram showing an exemplary configuration of a projection-type image display apparatus 1C according to a second modification of the first embodiment;

FIG. 18 is a schematic diagram showing an exemplary configuration of a projection-type image display apparatus 1D according to a second embodiment;

DETAILED DESCRIPTION OF EMBODIMENTS

Figure 1:
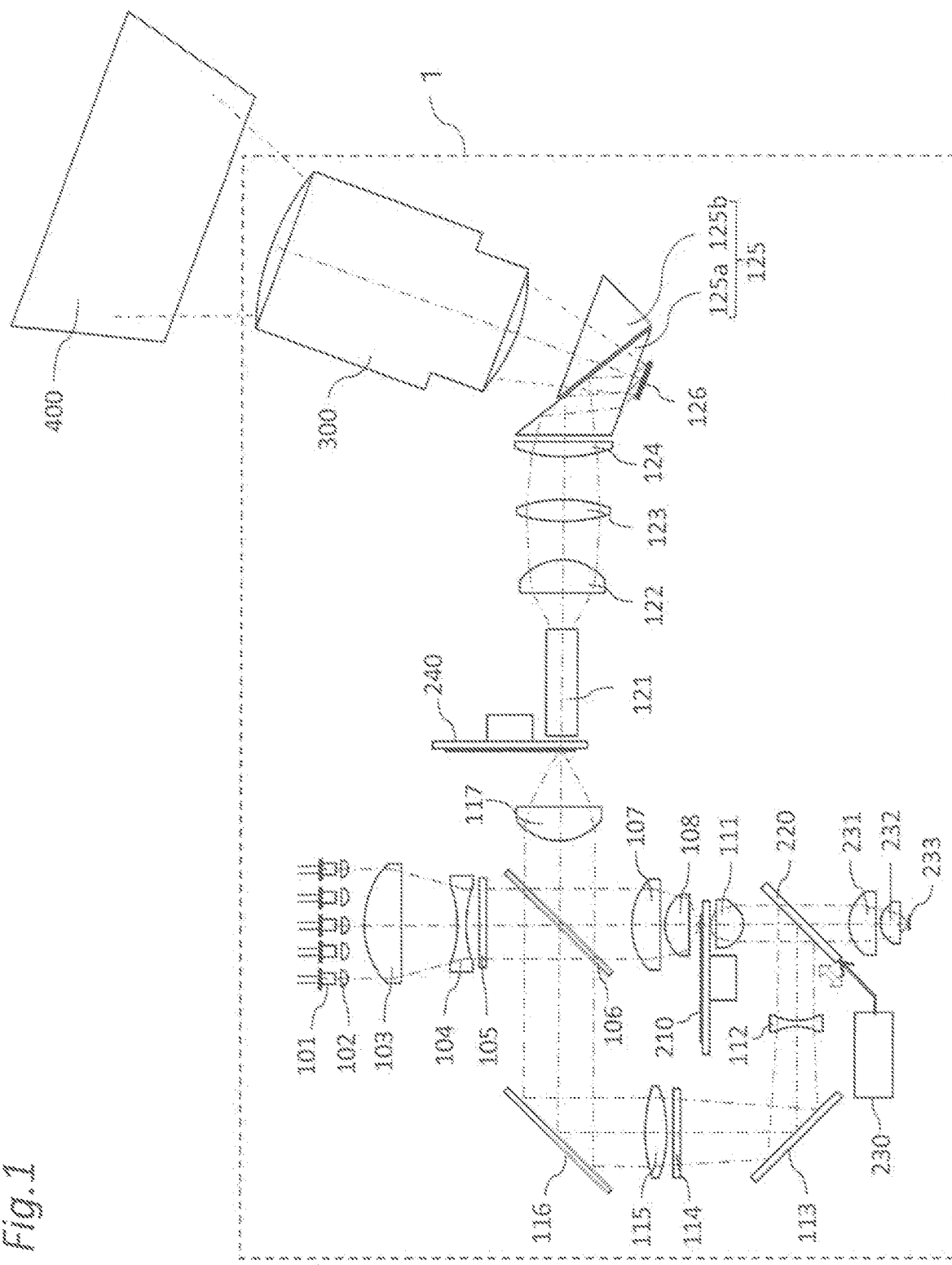
FIG. 1 is a schematic diagram showing an exemplary configuration of a projection-type image display apparatus 1 according to a first embodiment.

Embodiments will now be described in detail with reference to the drawings as needed. It is noted that detailed description will not be provided more than necessary in some cases. For example, detailed description of already well-known facts and repeated description of substantially the same constituent elements may not be provided. This is for the purpose of avoiding unnecessary redundancy of the following description and facilitating understanding by those skilled in the art.

The accompanying drawings and the following description are provided for sufficient understanding of the present disclosure by those skilled in the art, and it is not intended to limit the subject matter described in claims thereto.

To simplify a device and reduce costs, a conventionally provided projection-type image display apparatus applies color component lights (e.g., red, green, and blue lights) to a single light modulation element in a time-division manner to switch and display color components different from each other at high speed in frames of images and thereby allows a viewer to perceive full-color images. For example, when a blue solid-state light source element and a phosphor are used as a light source in such a projection-type image display apparatus, generally, a blue light generated by the solid-state light source element is directly used as the blue light applied to the light modulation element. However, when the luminous efficiency of the solid-state light source element is maximized, the spectral characteristic of the blue light generated by the solid-state light source element is not necessarily identical to the preferable spectral characteristic of the blue light to be projected by the projection-type image display apparatus. Moreover, the spectral characteristic of the blue light exciting the phosphor in a manner maximizing the luminous efficiency of the phosphor is not necessarily identical to the preferable spectral characteristic of the blue light to be projected by the projection-type image display apparatus. Therefore, considering the luminous efficiencies of the solid-state light source element and the phosphor, this causes a problem that a spectral characteristic of blue light of a lighting apparatus and a projection-type image display apparatus deviates from the preferable spectral characteristic of blue light to be projected by the projection-type image display apparatus.

To improve the spectral characteristic of blue light, for example, the invention of JP 2018-054667 A has been proposed. The invention of JP 2018-054667 A includes a wavelength selective reflection plate reflecting a portion of a blue light and transmitting a remaining blue light and other color lights, a fluorescent plate excited by the blue light transmitted through the wavelength selective reflection plate to generate a green light, and a condensing element condensing the green light generated by the fluorescent plate and emitting the green light toward the wavelength selective reflection plate. The wavelength selective reflection plate is disposed on a portion of a phosphor wheel, for example. The invention of JP 2018-054667 A improves the spectral characteristic of blue light by combining the blue light reflected by the wavelength selective reflection plate and the green light generated by the fluorescent plate and transmitted through the wavelength selective reflection plate.

The invention of JP 2018-054667 A requires a significant change in configuration of an existing projection-type image display apparatus so as to provide the phosphor wheel integrated with the wavelength selective reflection plate, the reflection plate, and the condensing element. Therefore, it is desired that a spectral characteristic of a certain color component light can be improved without requiring significant changes in configurations of existing illumination and projection-type image display apparatuses.

In the invention of JP 2018-054667 A, the green light is always combined with the blue light. Since the luminous efficiency of the fluorescent plate is less than 100%, using a portion of the blue light to excite the fluorescent plate always reduces the luminance of the blue light as compared to when the green light is not combined with the blue light. In the invention of JP 2018-054667 A requires a significant change in the configuration again so as to generate a blue light not being combined with a green light. Therefore, it is desired that whether to improve a spectral characteristic of a certain color component light is selectable with a simple configuration.

The following embodiments provide a lighting apparatus and a projection-type image display apparatus capable of selectively improving a spectral characteristic of a certain color component light with a simple configuration without requiring significant changes in configurations of existing illumination and projection-type image display apparatuses.

First Embodiment

A projection-type image display apparatus according to a first embodiment will now be described with reference to FIGS. 1 to 17

A projection-type image display apparatus including a digital micromirror device (hereinafter referred to as "DMD") as a light modulation element will hereinafter be described as a specific embodiment of the present disclosure.

[1-1. Configuration]

FIG. 1 is a schematic diagram showing an exemplary configuration of a projection-type image display apparatus 1 according to the first embodiment. The projection-type image display apparatus 1 includes a plurality of laser diodes (LDs) 101, a plurality of collimator lenses 102, a condenser lens 103, a concave lens 104, an optical diffuser 105, a dichroic mirror 106, condenser lenses 107, 108, a phosphor wheel device 210, a condenser lens 111, a dichroic mirror 220, a driving device 230, condenser lenses 231, 232, a phosphor 233, a concave lens 112, a reflective mirror 113, an optical diffuser 114, a convex lens 115, a reflective mirror 116, and a condenser lens 117. In this description, these constituent elements of the projection-type image display apparatus 1 are also referred to as a "lighting apparatus". The projection-type image display apparatus 1 further includes a filter wheel device 240, a rod integrator 121, relay lenses 122, 123, 124, a total internal reflection prism (TIR prism) 125, a digital micromirror device (DMD) 126, and a projection optical system 300. The lighting apparatus described above generates an illumination light to be applied to the digital micromirror device 126. The digital micromirror device 126 spatially modulates the illumination light incident from the lighting apparatus and thereby generates an image light to be projected onto a screen 400.

The projection-type image display apparatus 1 includes a dichroic mirror 220, a driving device 230, condenser lenses 231, 232, and a phosphor 233 so as to improve a spectral characteristic of a blue light generated by the laser diode 101. The phosphor 233 is excited by a blue light to generate a green light. An optical system includes the dichroic mirror 106, the condenser lenses 107, 108, the phosphor wheel device 210, the condenser lens 111, the dichroic mirror 220, the condenser lenses 231, 232, the concave lens 112, the reflective mirror 113, the optical diffuser 114, the convex lens 115, and the reflective mirror 116 and is configured to combine the blue light generated by the laser diode 101 and the green light generated by the phosphor 233 with each other in the dichroic mirror 106.

The LDs 101 generate a linearly polarized blue light in a wavelength width of 447 nm to 462 nm. The LDs 101 are arranged such that an outgoing light is P-polarized with respect to an incident surface of the dichroic mirror 106. The collimator lens 102 each collimate a light emitted from the corresponding one LD 101. The condenser lens 103 and the concave lens 104 constitute an afocal system converging a parallel light to generate a narrower parallel light. Specifically, the condenser lens 103 condenses the parallel light from the plurality of the collimator lenses 102, and the concave lens 104 collimates the light from the condenser lens 103. The optical diffuser 105 diffuses the light from the concave lens 104. The light passing through the optical diffuser 105 is made incident on the dichroic mirror 106.

In this description, the LDs 101 are also referred to as a "light source".

Figure 2:
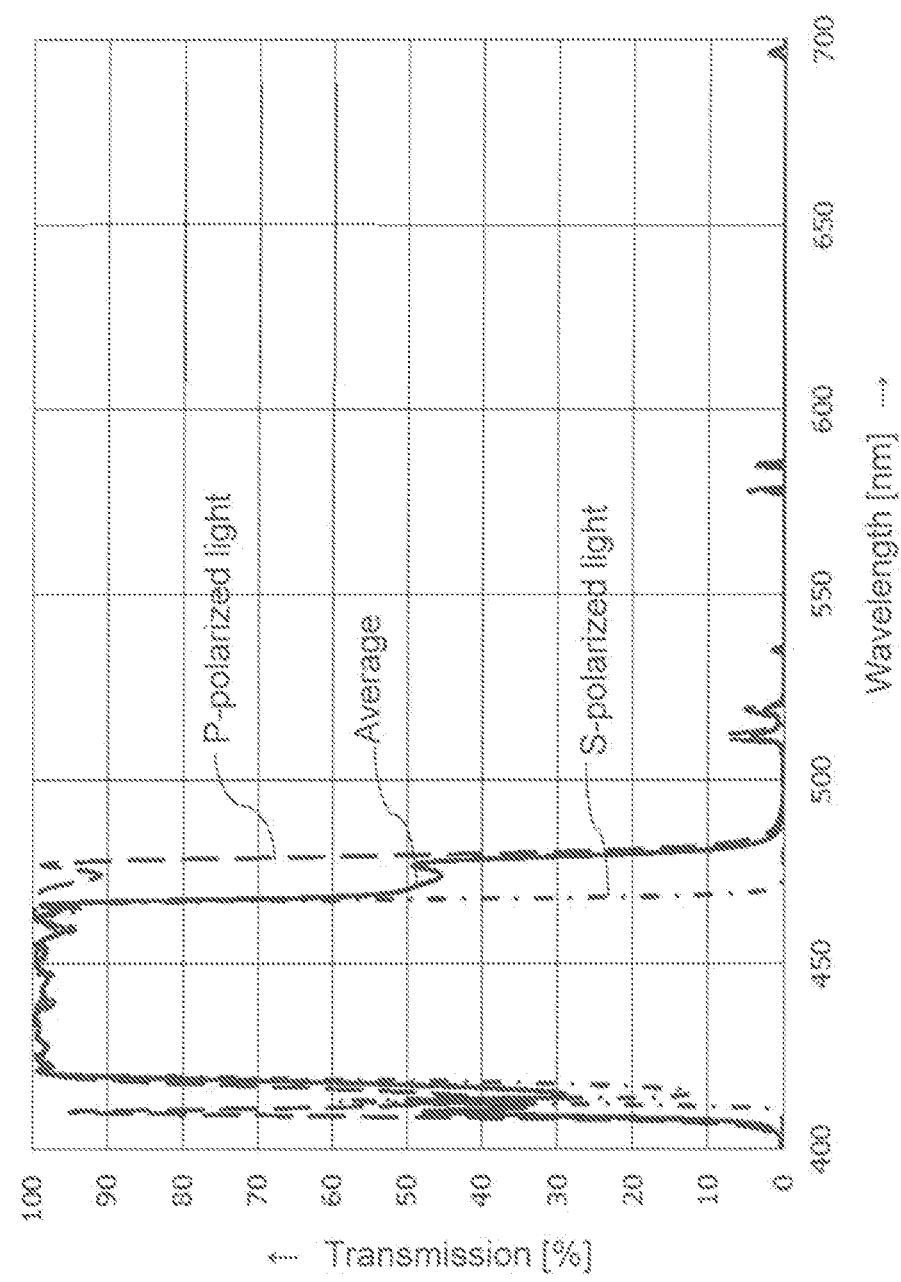
FIG. 2 is a graph showing an exemplary transmission characteristic of a dichroic mirror 106 of FIG. 1.

FIG. 2 is a graph showing an exemplary transmission characteristic of the dichroic mirror 106 of FIG. 1. The dichroic mirror 106 transmits and reflects respective halves of an S-polarized blue light having a wavelength of 465 nm incident thereon and transmits and reflects respective halves of a P-polarized blue light having a wavelength of 472 nm incident thereon. The dichroic mirror 106 reflects 95% or more of green and red lights regardless of polarization. Since the P-polarized blue light is incident on the dichroic mirror 106 from the optical diffuser 105, the blue light is transmitted through the dichroic mirror 106 and proceeds to the condenser lens 107.

The blue light made incident on and transmitted through the dichroic mirror 106 from the optical diffuser 105 is made incident on the condenser lenses 107, 108 and then condensed on a surface of the phosphor wheel device 210. The focal distance of the condenser lens 108 is set to form a converging angle of 40 degrees or less, and a condensing spot is formed near the phosphor wheel device 210.

Figure 4:
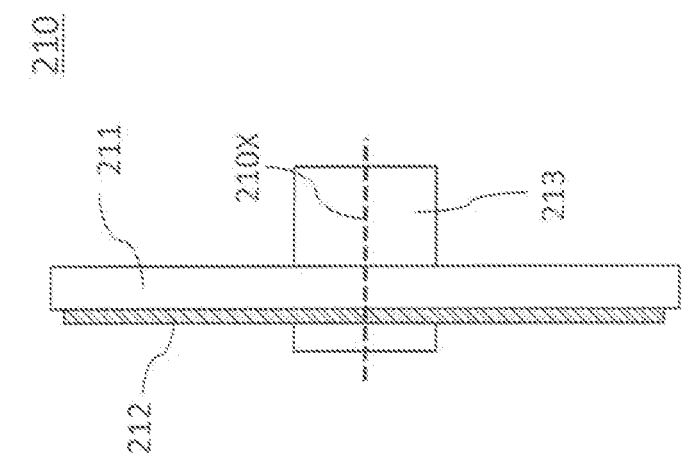
FIG. 4 is a side view showing an exemplary configuration of the phosphor wheel device 210 of FIG. 1.
Figure 3:
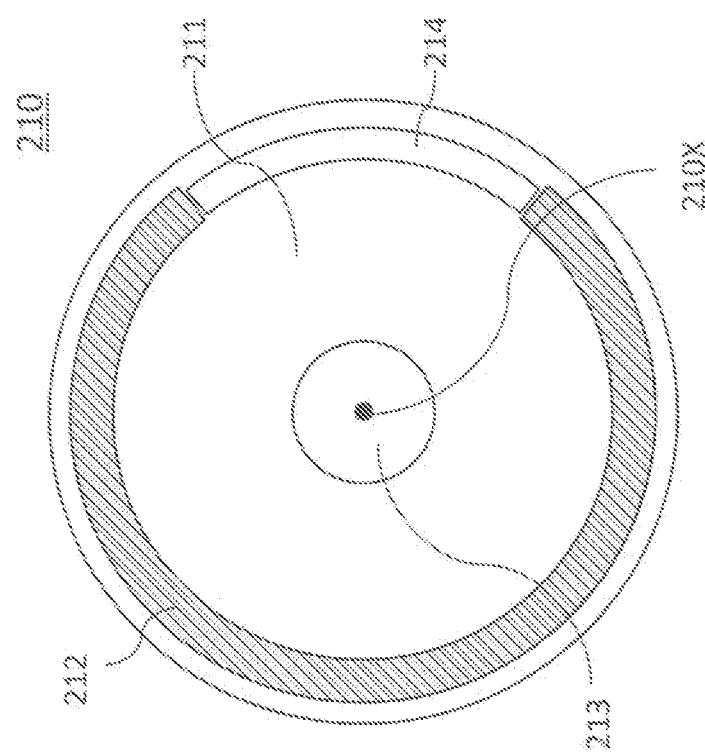
FIG. 3 is a front view showing an exemplary configuration of a phosphor wheel device 210 of FIG. 1.

FIG. 3 is a front view showing an exemplary configuration of the phosphor wheel device 210 of FIG. 1. FIG. 4 is a side view showing an exemplary configuration of the phosphor wheel device 210 of FIG. 1. FIG. 3 shows the surface on which the light enters the phosphor wheel device 210 from the condenser lens 108. The phosphor wheel device 210 includes a central axis 210X, an aluminum substrate 211, a phosphor layer 212, a driving motor 213, and a slit 214.

The aluminum substrate 211 is a circular substrate including the driving motor 213 in a central portion and rotatable around the central axis 210X. A reflective film (not shown) is formed on a surface of the aluminum substrate 211, and a phosphor layer 212 is further formed on a surface of the reflective film. The reflective film is a metal layer or a dielectric film reflecting visible light. The slit 214 is disposed in a portion of the aluminum substrate 211. The phosphor layer 212 is provided with a Ce-activated YAG-based yellow phosphor excited by a blue light to generate a yellow light containing wavelength components of green and red lights. A typical chemical composition of the crystal matrix of this yellow phosphor is $Y_3Al_5O_{12}$. Although the phosphor layer 212 is formed substantially in a ring shape, the slit 214 for transmitting the blue light is disposed in a portion of the ring without the phosphor layer 212.

In this description, the phosphor wheel device 210 is also referred to as a "first phosphor wheel device".

The phosphor layer 212 is excited by the spot light from the condenser lens 108 and thereby generates a yellow light containing green and red lights. The phosphor wheel device 210 can rotate the aluminum substrate 211 around the central axis 210X to suppress a rise in temperature of the phosphor layer 212 due to excitation with the blue light and stably maintain the fluorescence conversion efficiency. A portion of the green and red lights generated by the phosphor layer 212 is emitted toward the condenser lens 108. The green and red lights generated by the phosphor layer 212 and proceeding toward the reflective film are reflected by the reflective film and emitted toward the condenser lens 108. The green and red lights generated by the phosphor layer 212 are emitted as natural lights having a random polarization state. The green and red lights emitted from the phosphor layer 212 are condensed again and converted into substantially parallel lights by the condenser lenses 108, 107 and are then reflected by the dichroic mirror 106 before proceeding to the condenser lens 117.

On the other hand, the blue light incident on the slit 214 of the phosphor wheel device 210 from the condenser lens 108 directly passes through the slit 214 and is converted by the condenser lens 111 into a substantially parallel and wide light beam before proceeding to the dichroic mirror 220.

FIG. 5 is a schematic diagram showing an exemplary configuration of the dichroic mirror 220 of FIG. 1. The dichroic mirror 220 includes a dichroic coat layer 221 and an AR (anti-reflection) coat layer 222 formed on a flat transparent substrate such as glass. The dichroic coat layer 221 reflects blue light and transmits green light. The AR coat layer 222 transmits blue light and green light. The region of the AR coat layer 222 is disposed inside the region of the dichroic coat layer 221 and has a size smaller than the spot size of the blue light made incident on the dichroic mirror 220 from the condenser lens 111 (i.e., the light source). As a result, the dichroic mirror 220 partially transmits the blue light, partially reflects the blue light, and transmits the green light (described later) generated by the phosphor 233 at a certain moment.

Figure 6:
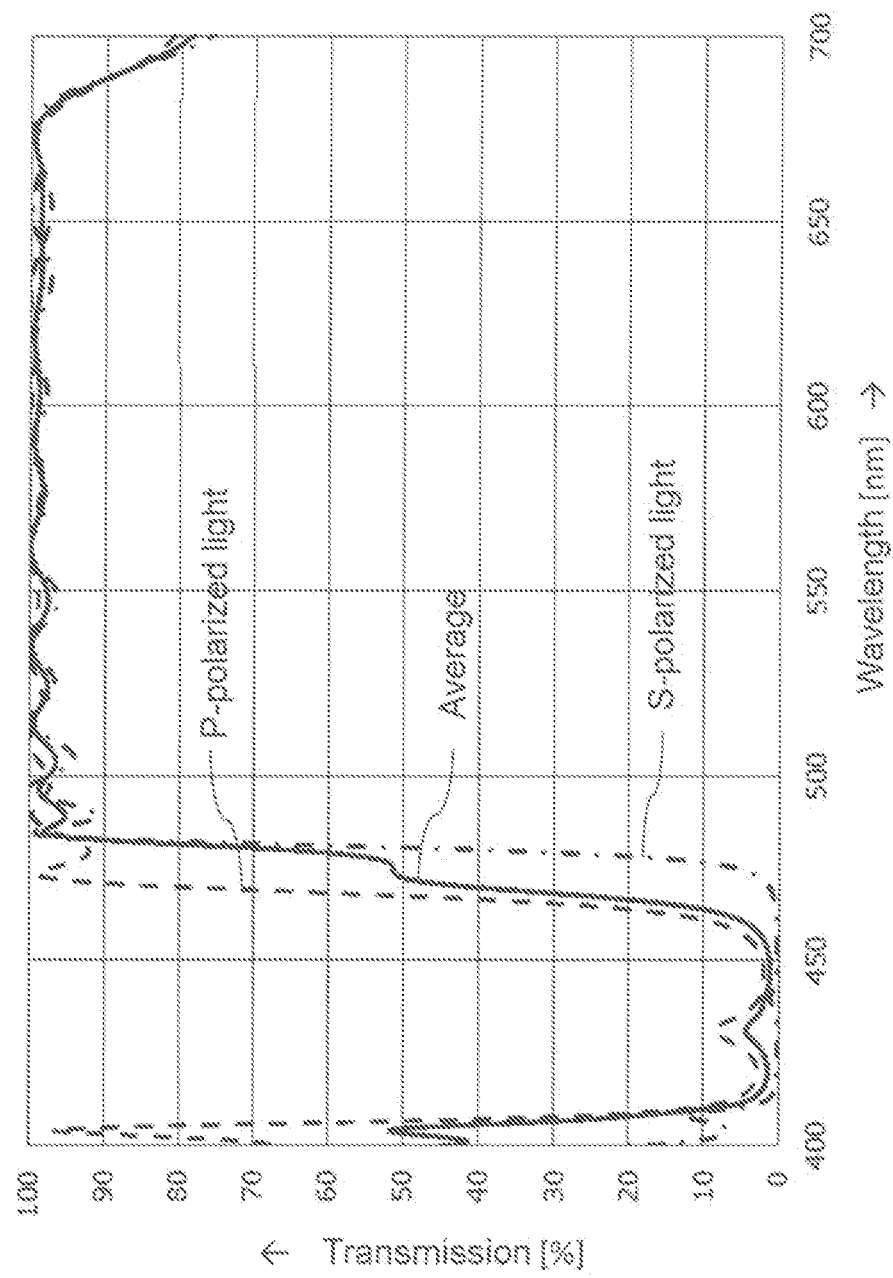
FIG. 6 is a graph showing an exemplary transmission characteristic of the dichroic mirror 220 of FIG. 1.

FIG. 6 is a graph showing an exemplary transmission characteristic of the dichroic mirror 220 of FIG. 1. The dichroic mirror 220 transmits and reflects respective halves of an S-polarized blue light having a wavelength of 472 nm incident thereon and transmits and reflects respective halves of a P-polarized blue light having a wavelength of 465 nm incident thereon. The dichroic mirror 220 transmits 95% or more of green and red lights regardless of polarization. In the example of FIG. 1, the blue light incident on the dichroic mirror 220 from the condenser lens 111 has P-polarized light similarly to the blue light incident on the dichroic mirror 220 from the optical diffuser 105.

In FIG. 5, the shape of the AR coat layer 222 is shown as a circle; however, the shape may be a polygon or other shapes.

In this description, the dichroic mirror 220 is also referred to as a "separation element". In this description, the dichroic coat layer 221 is also referred to as a "first region", and the AR coat layer 222 is also referred to as a "second region".

The driving device 230 moves the dichroic mirror 200 to switch whether the blue light incident on the dichroic mirror 200 from the condenser lens 111 is all incident on the dichroic coat layer 221 or partially incident on the AR coat layer 222. In the former case, all the blue light incident on the dichroic mirror 200 from the condenser lens 111 is reflected by the dichroic coat layer 221. On the other hand, in the latter case, a portion of the blue light incident on the dichroic mirror 200 from the condenser lens 111 is transmitted through the AR coat layer 222 and the rest is reflected by the dichroic coat layer 221. As a result, the dichroic mirror 220 is configured to have variable transmittance and reflectance with respect to blue light.

A large portion of the blue light incident on the dichroic mirror 220 from the condenser lens 111 is reflected by the dichroic coat layer 221 and converted into a substantially parallel light beam via the concave lens 112, the reflective mirror 113, the optical diffuser 114, and the convex lens 115. The blue light converted into a substantially parallel light beam by the convex lens 115 is reflected by the reflective mirror 116 and made incident on the dichroic mirror 106. The blue light incident on the dichroic mirror 106 is transmitted through the dichroic mirror 106 and proceeds to the condenser lens 117.

On the other hand, a portion of the blue light incident on the dichroic mirror 220 from the condenser lens 111 is transmitted through the AR coat layer 222 and condensed on a surface of the phosphor 233 via the condenser lenses 231, 232. The focal distance of the condenser lens 232 is set to form a converging angle of 40 degrees or less, and a condensing spot is formed near the phosphor 233.

The phosphor 233 includes a plate-shaped substrate, a reflective film formed on a surface of the plate-shaped substrate, and a phosphor layer formed on a surface of the reflective film. The reflective film is a metal layer or a dielectric film reflecting visible light. The phosphor 233 is provided with a Ce-activated LAG-based green phosphor excited by a blue light to generate a green light. A typical chemical composition of the crystal matrix of the green phosphor is $Lu_3Al_5O_{12}$.

The phosphor 233 is excited by the spot light from the condenser lens 232 and thereby generates a green light. A radiator plate (not shown) is disposed on a back surface of the phosphor 233 and can suppress a rise in temperature of the phosphor 233 due to excitation with the blue light and stably maintain the fluorescence conversion efficiency. A portion of the green light generated by the phosphor 233 is emitted toward the condenser lens 232. The green light generated by the phosphor 233 and proceeding toward the reflective film is reflected by the reflective film and emitted toward the condenser lens 232. The green light generated by the phosphor 233 is emitted as a natural light having a random polarization state. The green light emitted from the phosphor 233 is condensed again and converted into a substantially parallel light by the condenser lenses 232, 231 and is then transmitted through the dichroic mirror 220 before proceeding to the condenser lens 111.

The green light transmitted through the condenser lens 111 is condensed by the condenser lens 111 and passes through the slit 214 of the phosphor wheel device 210. Subsequently, the green light is converted into a substantially parallel light by the condenser lenses 108, 107 and then reflected by the dichroic mirror 106 before proceeding to the condenser lens 117.

In this description, the phosphor 233 is also referred to as an "illuminant". In this description, the blue light generated by the LDs 101 is also referred to as a "first color component light", and the green light generated by the phosphor 233 is also referred to as a "second color component light".

The blue light that made incident on and reflected by the dichroic mirror 220 from the light source and the green light made incident on and transmitted through the dichroic mirror 220 from the phosphor 233 are combined with each other in the dichroic mirror 106. In this way, by combining the green light with the blue light (referred to as "combined blue light"), a preferable spectral characteristic of the blue light to be projected by the projection-type image display apparatus 1 can be achieved.

The yellow light containing the green light and the red light generated by the phosphor layer 212 and the combined blue light containing the green light generated by the phosphor 233 are obtained as described above, and these color component lights proceed from the dichroic mirror 106 to the condenser lens 117. When these color component lights are combined by time division multiplexing, the lights are visually recognized as a white light. The light incident on the condenser lens 117 from the dichroic mirror 106 is condensed onto the filter wheel device 240.

Figure 8:
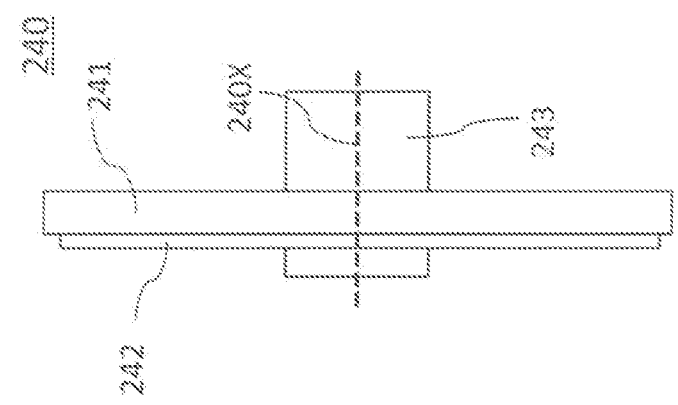
FIG. 8 is a side view showing the exemplary configuration of the filter wheel device 240 of FIG. 1.
Figure 7:
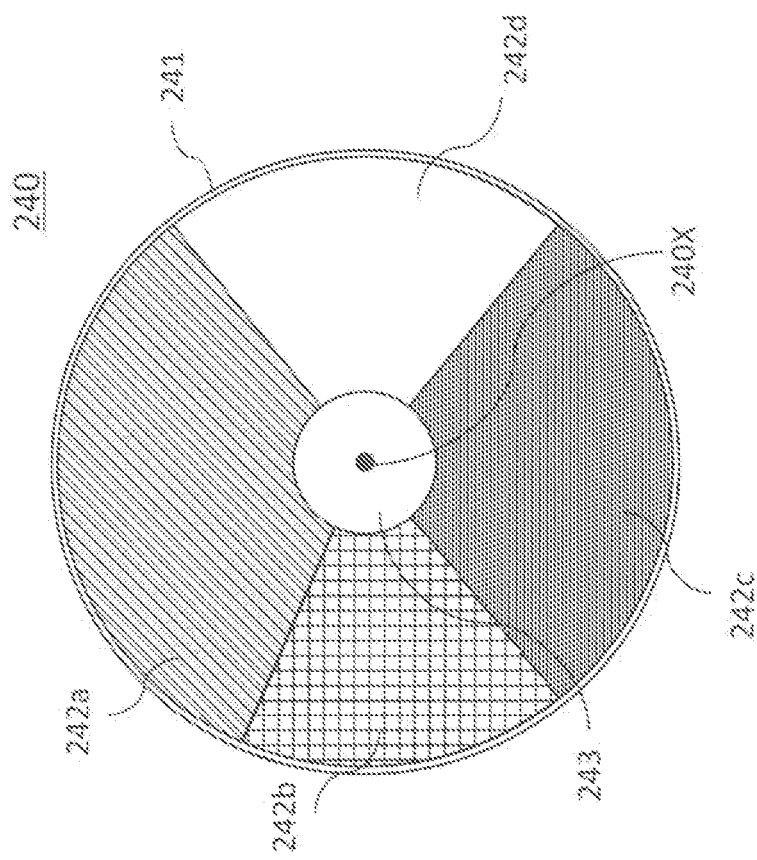
FIG. 7 is a front view showing an exemplary configuration of a filter wheel device 240 of FIG. 1.

FIG. 7 is a front view showing an exemplary configuration of the filter wheel device 240 of FIG. 1. FIG. 8 is a side view showing an exemplary configuration of the filter wheel device 240 of FIG. 1. FIG. 7 shows a surface on which the light enters the filter wheel device 240 from the condenser lens 117. The filter wheel device 240 includes a central axis 240X, a transparent substrate 241, a dichroic film 242, and a driving motor 243.

The transparent substrate 241 is a circular substrate including the driving motor 243 in a central portion and rotationally controllable around the central axis 240X. The transparent substrate 241 is made up of, for example, a glass plate having a high transmittance over the entire visible range. The dichroic film 242 is formed on a surface of the transparent substrate 241 so as to transmit only a desired wavelength band. For example, as shown in FIG. 7, the dichroic film 242 includes four fan-shaped regions, i.e., dichroic films 242a to 242d. For example, the dichroic film 242a transmits only yellow light (green light+red light), the dichroic film 242b transmits only red light, the dichroic film 242c transmits only green light, and the dichroic film 242d transmits blue light and true green light.

The phosphor wheel device 210 and the filter wheel device 240 are controlled to rotate in synchronization with each other. For example, the position of the phosphor layer 212 of FIG. 3 and the positions of the dichroic films 242a to 242c of FIG. 6 are controlled in a temporally synchronized manner. As a result, the yellow light containing the green light and the red light emitted from the phosphor layer 212 of FIG. 3 is respectively separated into the yellow light, the red light, and the green light when passing through the dichroic films 242a to 242c of FIG. 4. On the other hand, the combined blue light containing the green light generated by the phosphor 233 and passing through the slit 214 of FIG. 3 has a color component on the long wavelength side of the green light cut when passing through the dichroic film 242d of FIG. 4 and is changed to a combined blue light containing a true green light instead of the green light. The color component lights respectively transmitted through the dichroic films 242a to 242d proceed to the rod integrator 121 of FIG. 1.

Figure 9:
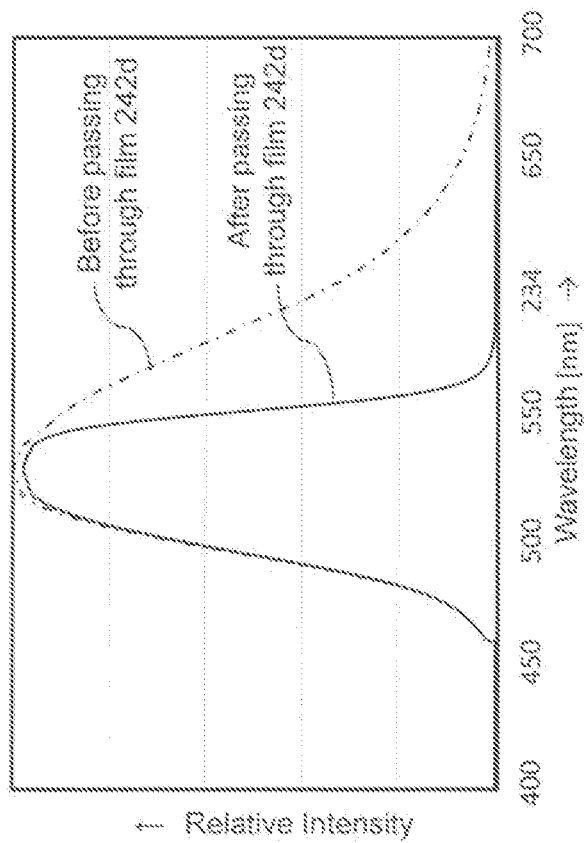
FIG. 9 is a diagram showing spectral characteristics of a dichroic film 242d of FIG. 7.

FIG. 9 is a diagram showing spectral characteristics of the dichroic film 242d of FIG. 7. FIG. 9 shows the spectral characteristics when the green light generated by the phosphor 233 passes through the dichroic film 242d. The green light generated by the phosphor 233 has the color component on the long wavelength side cut due to passing through the dichroic film 242d and is converted to have the spectral characteristic of the true green light. The cutoff wavelength of the dichroic film 242d is 552 nm, for example. In this case, the green light after passing through the dichroic film 242d has x-y chromaticity coordinates in the CIE1931 color space: x=0.158, y=0.686, for example.

Figure 10:
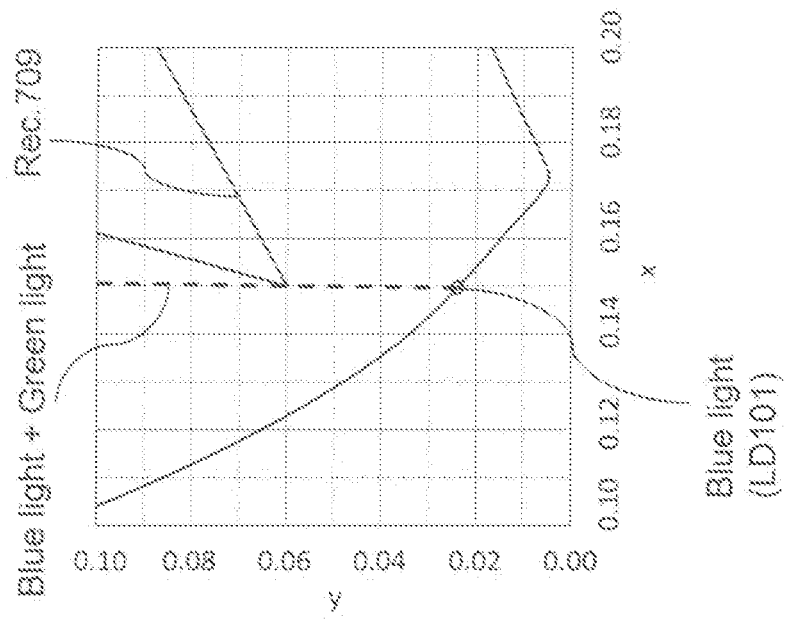
FIG. 10 is an x-y chromaticity diagram of the CIE1931 color space of the projection-type image display apparatus 1 of FIG. 1.

FIG. 10 is an x-y chromaticity diagram of the CIE 1931 color space of the projection-type image display apparatus 1 of FIG. 1. FIG. 10 shows a color space of Rec. 709 and chromaticity coordinates of the blue light of the LDs 101. The blue light of the LDs 101 has, for example, a main wavelength of 456 nm and x-y chromaticity coordinates: x=0.150, y=0.026. The combined blue light including the true green light transmitted through the dichroic film 242d moves in the color space as indicated by a broken line in accordance with an intensity ratio of the blue light and the true green light. The intensity ratio of the blue light and the true green light can be adjusted by the size of the AR coat layer 222 in the dichroic mirror 220. By adjusting the intensity ratio of the blue light and the true green light, the spectral characteristic of the blue light projected by the projection-type image display apparatus 1 can be matched to the coordinates of blue light of Rec. 709: x=0.150, y=0.060.

As described above, the yellow light and the combined blue light incident on the filter wheel device 240 from the condenser lens 117 are separated into the red light, the green light, the blue light, and the yellow light by the filter wheel device 240 and proceed to the rod integrator 121. These red, green, and blue lights show favorable three primary colors, and color synthesis of these color component lights through time division multiplexing can provide light emission characteristics with favorable white balance. Furthermore, these color component lights can be converted into colors having desired chromaticity coordinates by adjusting on-time and off-time of pixels of the DMD 126.

The rod integrator 121 is a solid rod made up of a transparent member of glass etc. The rod integrator 121 internally reflects an incident light multiple times to generate a light having a uniform intensity distribution. The rod integrator 121 may be a hollow rod having an inner wall made up of a mirror surface.

The relay lenses 122, 123, 124 forms an image of the outgoing light of the rod integrator 121 substantially on the DMD 126. The outgoing light of the rod integrator 121 is transmitted through the relay lenses 122, 123, 124 and made incident on the total internal reflection prism (TIR prism) 125. The TIR prism 125 is made up of two prisms 125b, 125a and has a thin air layer (not shown) formed in a plane where the prisms 125b, 125a are close to each other. The air layer totally reflects the light emitted from the prism 125a at an angle greater than a critical angle. The light incident on the TIR prism 125a from the relay lens 124 is totally reflected by this air layer and forms an image substantially on the DMD 126.

The DMD 126 spatially modulates the light incident on the DMD 126 based on various control signals such as an image signal and generates an image light having a different light intensity for each pixel by time division for each of the color component lights. Specifically, the DMD 126 has a plurality of movable micromirrors. Each of the micromirrors basically corresponds to one pixel. The DMD 126 changes an angle of each of the micromirrors based on a modulation signal from the control signal and thereby switches whether to direct a reflected light to the projection optical system 300. When a certain micromirror of the DMD 126 is turned on, the light reflected by the micromirror passes through both of the TIR prisms 125a, 125b and is made incident on the projection optical system 300 and then projected onto a projection surface of the screen 400.

The red image light, the green image light, the blue image light, and the yellow image light respectively generated by time division reach the projection surface of the screen 400 and are perceived as a full color image. In this case, if a time division cycle (frame rate) is slow, color flicker may be perceived by human eyes. Therefore, for example, by using video data having a high frame rate such as 60 frames/second (60 fps) and, for example, driving each cycle from the red light to the yellow light at a triple speed (180 fps) of the frame rate of the video data, the color flicker can be suppressed.

[1-2. Operation]

As shown in FIG. 5, the dichroic mirror 220 is configured to be movable. This enables switching whether the light incident on the dichroic mirror 220 from the condenser lens 111 is received by both the dichroic coat layer 221 and the AR coat layer 222 (ON state of FIG. 5) or by only the dichroic coat layer 221 (OFF state of FIG. 5).

Figure 12:
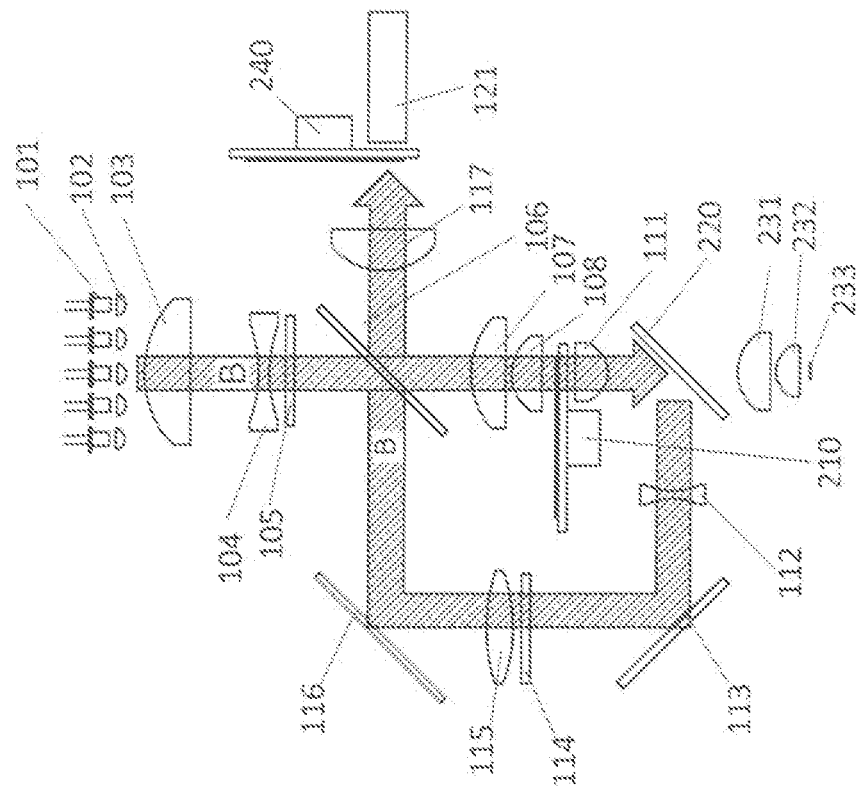
FIG. 12 is a schematic diagram showing a path of blue light when the spectral characteristic of blue light is not improved in the projection-type image display apparatus 1 of FIG. 1.
Figure 11:
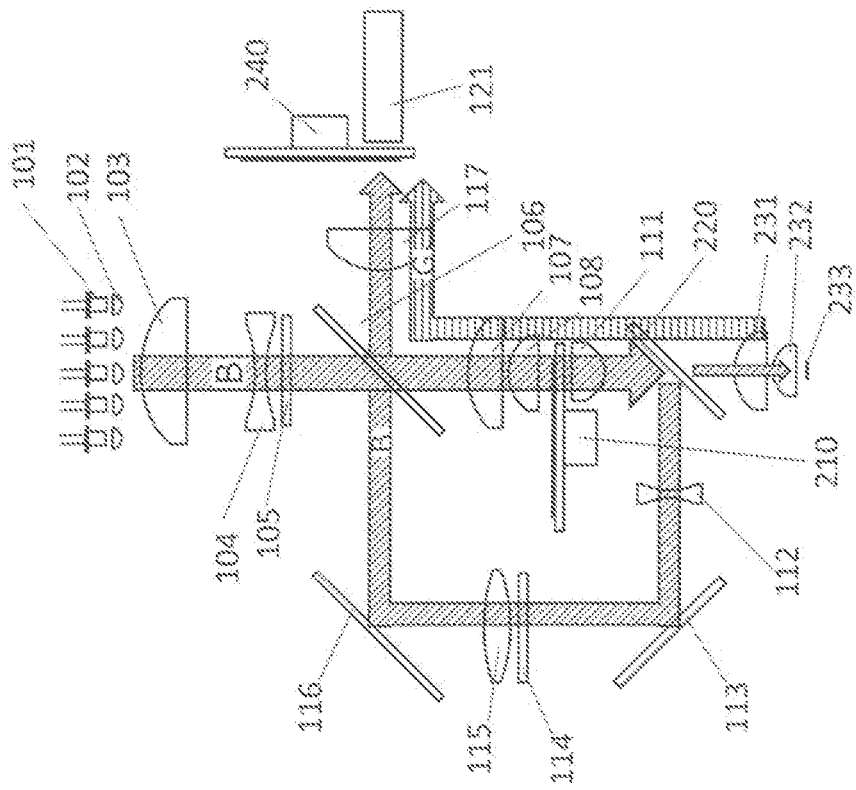
FIG. 11 is a schematic diagram showing a path of blue light when the spectral characteristic of blue light is improved in the projection-type image display apparatus 1 of FIG. 1.

FIG. 11 is a schematic diagram showing a path of blue light when the spectral characteristic of blue light is improved in the projection-type image display apparatus 1 of FIG. 1. FIG. 12 is a schematic diagram showing a path of blue light when the spectral characteristic of blue light is not improved in the projection-type image display apparatus 1 of FIG. 1. FIG. 11 shows a light path in the ON state of FIG. 5, and FIG. 12 shows a light path in the OFF state of FIG. 5.

In the case of FIG. 11, as described above, the blue light transmitted through the dichroic mirror 220 excites the phosphor 233, the blue light and the green light are combined by the dichroic mirror 106, and the combined blue light proceeds to the filter wheel device 240. Since the conversion efficiency of the phosphor 233 is less than 100%, the intensity of the combined blue light reaching the filter wheel device 240 becomes lower than the intensity of the blue light reaching the dichroic mirror 220 from the LD 101. If such a combined blue light is combined with the green light, the red light, and the yellow light to adjust the white balance, an overall luminance of a projection light is reduced although the spectral characteristic of the blue light is improved. Depending on a usage environment, it may be required to increase the overall luminance of the projection light even if the spectral characteristic of the blue light is reduced. Therefore, as shown in FIG. 12, by blocking the blue light reaching the phosphor 233 (the OFF state of FIG. 5), the intensity of the blue light reaching the filter wheel device 240 can be increased to make the overall luminance of the projection light higher.

As described above, the projection-type image display apparatus 1 according to the embodiment can selectively switch whether to improve the spectral characteristic of the blue light (or to allow a reduction in the overall luminance of the projection light), by a simple configuration and operation of moving the dichroic mirror 220.

Figure 13:
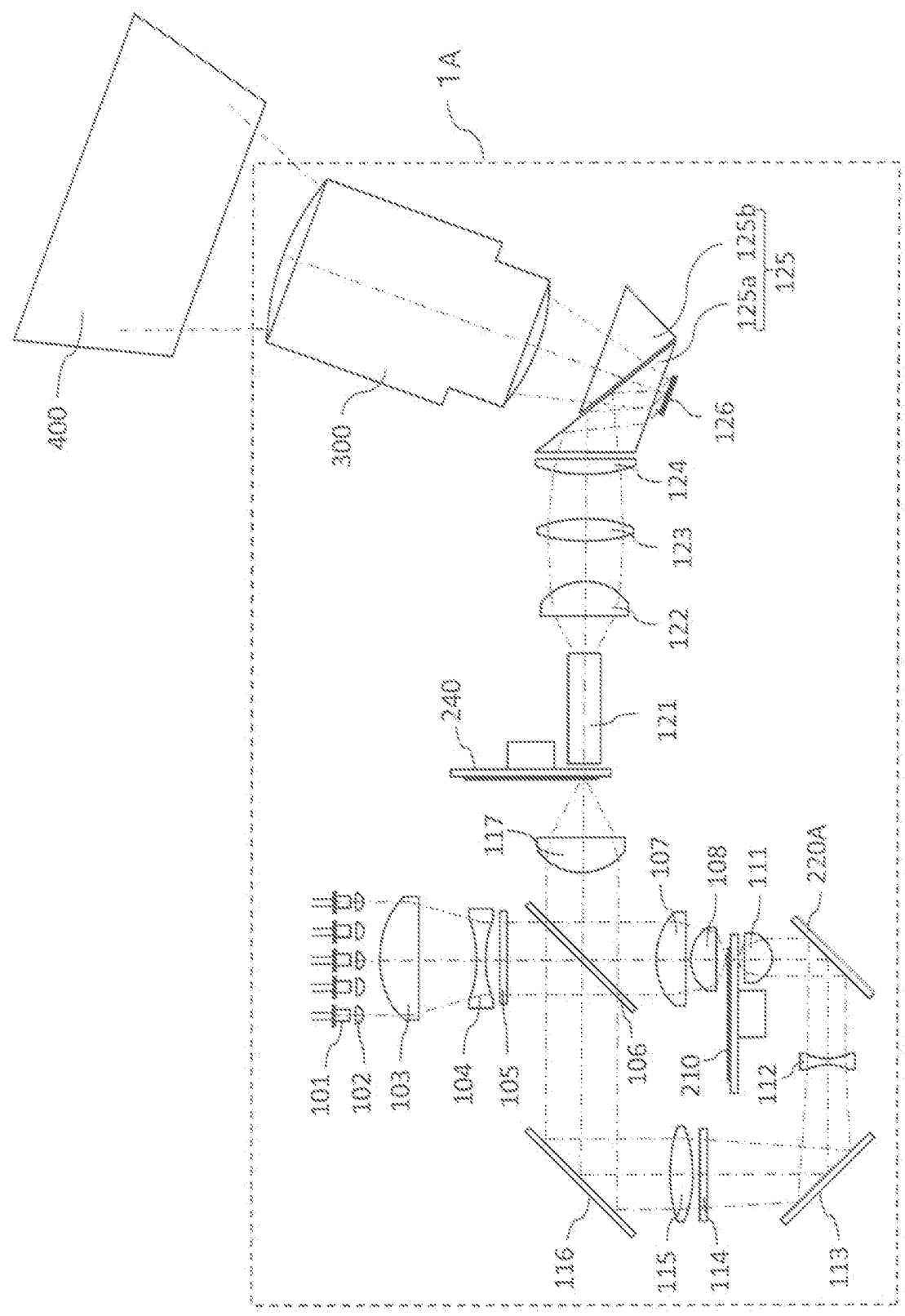
FIG. 13 is a schematic diagram showing an exemplary configuration of a projection-type image display apparatus 1A according to a comparative example of the first embodiment.

FIG. 13 is a schematic diagram showing an exemplary configuration of a projection-type image display apparatus 1A according to a comparative example of the first embodiment. The projection-type image display apparatus 1A includes a mirror 220A instead of the dichroic mirror 220, the driving device 230, the condenser lenses 231, 232, and the phosphor 233 shown in FIG. 1. According to the first embodiment, the spectral characteristic of blue light can be improved with a simple configuration without requiring significant changes in configuration of an existing device such as the projection-type image display apparatus 1A.

[1-3. Modification]

FIG. 14 is a schematic diagram showing an exemplary configuration of a dichroic mirror 220B according to a first modification of the first embodiment. The projection-type image display apparatus 1 of FIG. 1 may include a dichroic mirror 220B of FIG. 14 instead of the dichroic mirror 220 of FIG. 1. The dichroic mirror 220B has multiple AR coat layers 222, 223 different in size and is configured to be movable for switching which of the multiple AR coat layers 222, 223 the blue light is incident on. As a result, when the blue light and the green light are combined with each other, the intensity ratio of the color component lights can be changed.

The dichroic mirror may have three or more AR coat layers different in size.

FIG. 15 is a schematic diagram showing an exemplary configuration of a projection-type image display apparatus 1C according to a second modification of the first embodiment. The projection-type image display apparatus 1C includes a phosphor wheel device 250 instead of the phosphor 233 of FIG. 1. In the projection-type image display apparatus 1 of FIG. 1, the phosphor 233 is fixed and radiates heat by the radiator plate (not shown) on the back surface thereof. On the other hand, the projection-type image display apparatus 1C of FIG. 15 uses the rotating phosphor wheel device 250 so as to further enhance a heat dissipation effect.

Figure 17:
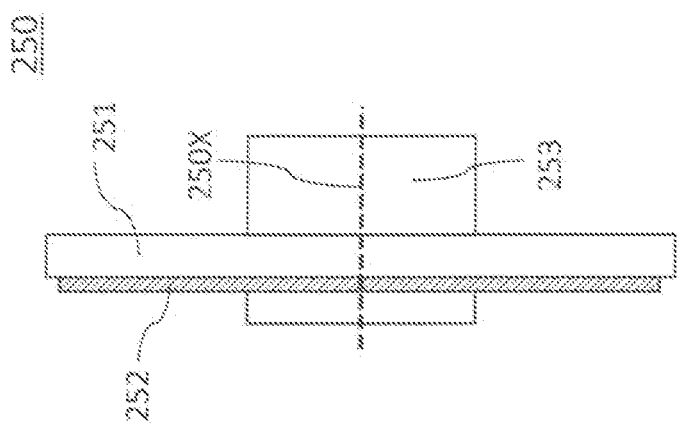
FIG. 17 is a side view showing an exemplary configuration of the phosphor wheel device 250 of FIG. 15.
Figure 16:
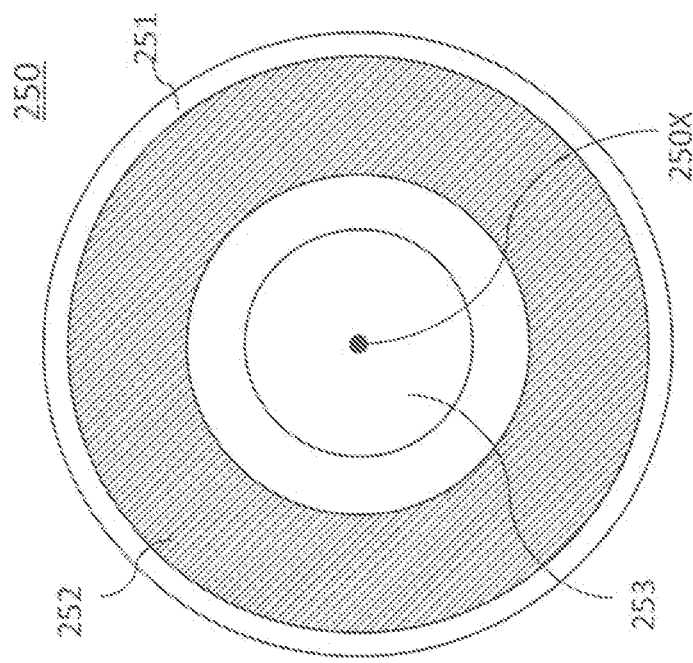
FIG. 16 is a front view showing an exemplary configuration of a phosphor wheel device 250 of FIG. 15.

FIG. 16 is a front view showing an exemplary configuration of the phosphor wheel device 250 of FIG. 15. FIG. 17 is a side view showing an exemplary configuration of the phosphor wheel device 250 of FIG. 15. FIG. 16 shows a surface on which the light enters the phosphor wheel device 250 from the condenser lens 232. The phosphor wheel device 250 includes a central axis 250X, an aluminum substrate 251, a phosphor layer 252, and a driving motor 253.

The aluminum substrate 251 is a circular substrate including the driving motor 253 in a central portion and rotationally controllable around the central axis 250X. A reflective film (not shown) is formed on a surface of the aluminum substrate 251, and a phosphor layer 252 is further formed on a surface of the reflective film. The reflective film is a metal layer or a dielectric film reflecting visible light. The phosphor layer 252 is provided with a Ce-activated LAG-based yellow phosphor excited by a blue light to generate a green light. A typical chemical composition of the crystal matrix of this yellow phosphor is $Lu_3Al_5O_{12}$. The phosphor layer 252 is formed into an annular shape.

In this description, the phosphor wheel device 250 is also referred to as a "second phosphor wheel device".

The phosphor wheel device 250 does not need to be synchronized with the phosphor wheel device 210 and the filter wheel device 240 and is independently driven when the blue light is made incident on the phosphor wheel device 250 from the dichroic mirror 220 (the ON state of FIG. 5). The phosphor wheel device 250 may be stopped when no blue light is made incident on the phosphor wheel device 250 from the dichroic mirror 220 (the OFF state of FIG. 5). The phosphor wheel device 250 can rotate the aluminum substrate 251 around the central axis 250X to suppress a rise in temperature of the phosphor layer 252 due to excitation with the blue light and stably maintain the fluorescence conversion efficiency.

The color component on the long wavelength side of the green light generated by the phosphor 233 or the phosphor wheel device 250 may be cut by the dichroic coat layer 221 of the dichroic mirror 220 instead of cutting by the dichroic film 242d of the filter wheel device 240. In this case, the dichroic coat layer 221 transmits and reflects respective halves of an S-polarized blue light having a wavelength of 472 nm incident thereon and transmits and reflects respective halves of a P-polarized blue light having a wavelength of 465 nm incident thereon. The dichroic coat layer 221 is configured to cut orange and red lights at a cutoff wavelength of 552 nm. The green light generated by the phosphor 233 or the phosphor wheel device 250 has the color component on the long wavelength side is cut when passing through the dichroic coat layer 221 and is converted to the spectral characteristic of true green light. The green light after passing through the dichroic coat layer 221 has x-y chromaticity coordinates in the CIE1931 color space: x=0.158, y=0.686, for example. In this case, the dichroic film 242d of the filter wheel device 240 is provided with a window of an AR coat film transmitting visible light. The combined color component light of the blue light and the true green light is transmitted through the dichroic film 242d without changing the spectral characteristic. With this configuration, the filter wheel device 240 can be reduced in cost.

[1-4. Effects]

The lighting apparatus and the projection-type image display apparatus according to the first embodiment include the LDs 101, the separation element, the phosphor 233, and the optical system. The LDs 101 generate the first color component light. The separation element partially transmits the first color component light, partially reflects the first color component light, and transmits the second color component light different from the first color component light at a certain moment. The phosphor 233 is excited by the first color component light transmitted through the separation element to generate the second color component light. The optical system combines the first color component light made incident on the separation element from the LD 101 and reflected by the separation element with the second color component light made incident on the separation element from the phosphor 233 and transmitted through the separation element. The separation element is configured to have variable transmittance and reflectance with respect to the first color component light.

As a result, the spectral characteristic of blue light can selectively be improved with a simple configuration without requiring significant changes in configurations of the existing devices.

According to the lighting apparatus and the projection-type image display apparatus of the first embodiment, the first color component light generated by the light source may linearly be polarized. The separation element includes the dichroic mirror 220 having the region of the dichroic coat layer 221 reflecting the first color component light and transmitting the second color component light and the region of the AR coat layer 222 transmitting the first and second color component lights, and the region of the AR coat layer 222 may be disposed inside the region of the dichroic coat layer 221 and may have a size smaller than the spot size of the first color component light incident on the dichroic mirror 220 from the light source. The dichroic mirror 220 may be configured to be movable for switching whether or not the first color component light is incident on the region of the AR coat layer 222.

As a result, by using the simple configuration and operation of moving the dichroic mirror 220, the spectral characteristic of blue light can selectively be improved with a simple configuration without requiring significant changes in configurations of the existing devices.

The light applied to the dichroic mirror 220 passes through the slit 214 of the phosphor wheel device 210 and is further converted into a substantially parallel and wide light beam by the condenser lens 111. Therefore, even when rotation unevenness and/or deflection of the phosphor wheel device occurs, the luminance of the light output from the projection-type image display apparatus 1 is stable, so that the projection-type image display apparatus capable of stable color composition can be provided.

According to the lighting apparatus and the projection-type image display apparatus of the first embodiment, the dichroic mirror 220 may have the multiple AR coat layers 222, 223 different in size and may be configured to be movable for switching which of the multiple AR coat layers 222, 223 the first color component light is incident on.

As a result, when combining the blue light and the green light with each other, the intensity ratio of the color component lights can be changed.

According to the lighting apparatus and the projection-type image display apparatus of the first embodiment, the first color component light may be a blue light, and the second color component light may be a color component light containing a green range.

As a result, the spectral characteristic of blue light can be improved.

According to the lighting apparatus and the projection-type image display apparatus of the first embodiment, the separation element may reflect a color component light having a wavelength longer than the wavelength in the green range of the second color component light.

As a result, by integrating a filtering function into the separation element, the filter wheel device etc. on the subsequent stage can be reduced in cost.

According to the lighting apparatus and the projection-type image display apparatus of the first embodiment, the light source may be a solid-state light source element.

As a result, the high-luminance projection-type image display apparatus 1 can be provided.

The lighting apparatus and the projection-type image display apparatus according to the first embodiment may further include the phosphor wheel device 210 having the slit 214 over a predetermined angular range. The first color component light is incident on the separation element from the light source via the slit. The optical system combines the first color component light reflected by the separation element with the second color component light transmitted through the separation element and passing through the slit.

As a result, the phosphor wheel device 210 can generate another color component light from the first color component light.

According to the lighting apparatus and the projection-type image display apparatus of the first embodiment, the phosphor may be disposed on the phosphor wheel device 250.

As a result, a rise in temperature of the phosphor due to excitation with the blue light can be suppressed to stably maintain the fluorescence conversion efficiency.

Second Embodiment

In the first embodiment, a dichroic mirror is used for partially transmitting and partially reflecting the blue light. In a second embodiment, description will be made of the case of using a half-wave plate and a polarization beam splitter instead of the dichroic mirror so as to partially transmit and partially reflect the blue light.

[2-1. Configuration]

FIG. 18 is a schematic diagram showing an exemplary configuration of a projection-type image display apparatus 1D according to the second embodiment. The projection-type image display apparatus 1D includes a half-wave plate 234, a polarization beam splitter 235, and a driving device 230D instead of the dichroic mirror 220 and the driving device 230 shown in FIG. 1.

The half-wave plate 234 rotates a polarization plane of the blue light coming from the condenser lens 111 over a predetermined angle. In an example of FIG. 18, the blue light incident on the half-wave plate 234 from the condenser lens 111 has P-polarized light similarly to the blue light incident on the dichroic mirror 220 from the optical diffuser 105.

The polarization beam splitter 235 partially transmits and partially reflects a blue light depending on the polarization of the blue light.

The driving device 230D rotates the half-wave plate 234 around an optical axis. Rotating the half-wave plate 234 changes the polarization plane of the blue light incident on the polarization beam splitter 235 from the half-wave plate 234. As a result, the half-wave plate 234 and the polarization beam splitter 235 are configured to have variable transmittance and reflectance with respect to the blue light.

In this description, the half-wave plate 234 and the polarization beam splitter 235 are also referred to as a "separation element".

Figure 19:
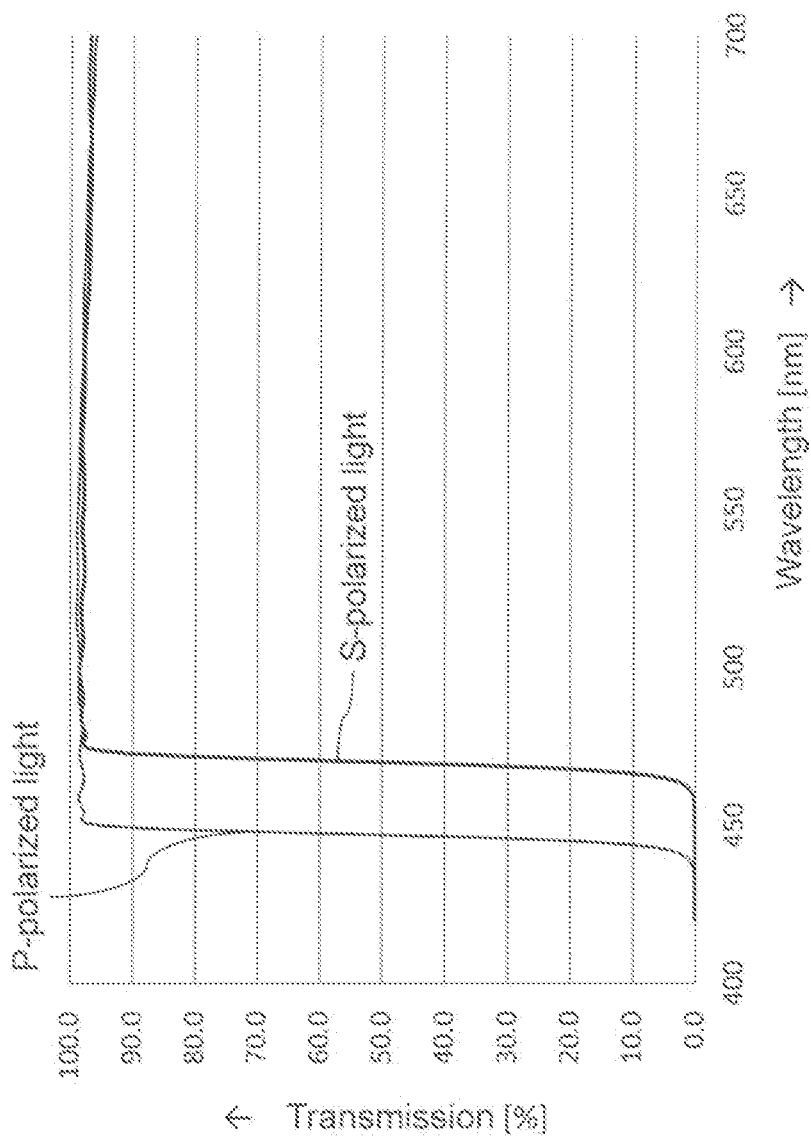
FIG. 19 is a graph showing an exemplary transmission characteristic of a polarization beam splitter 235 of FIG. 18.

FIG. 19 is a graph showing an exemplary transmission characteristic of the polarization beam splitter 235 of FIG. 18. The polarization beam splitter 235 transmits and reflects respective halves of an S-polarized blue light having a wavelength of 465 nm incident thereon and transmits and reflects respective halves of a P-polarized blue light having a wavelength of 442 nm incident thereon. The polarization beam splitter 235 transmits 96% or more of green and red lights regardless of polarization.

[2-2. Operation]

Figure 20:
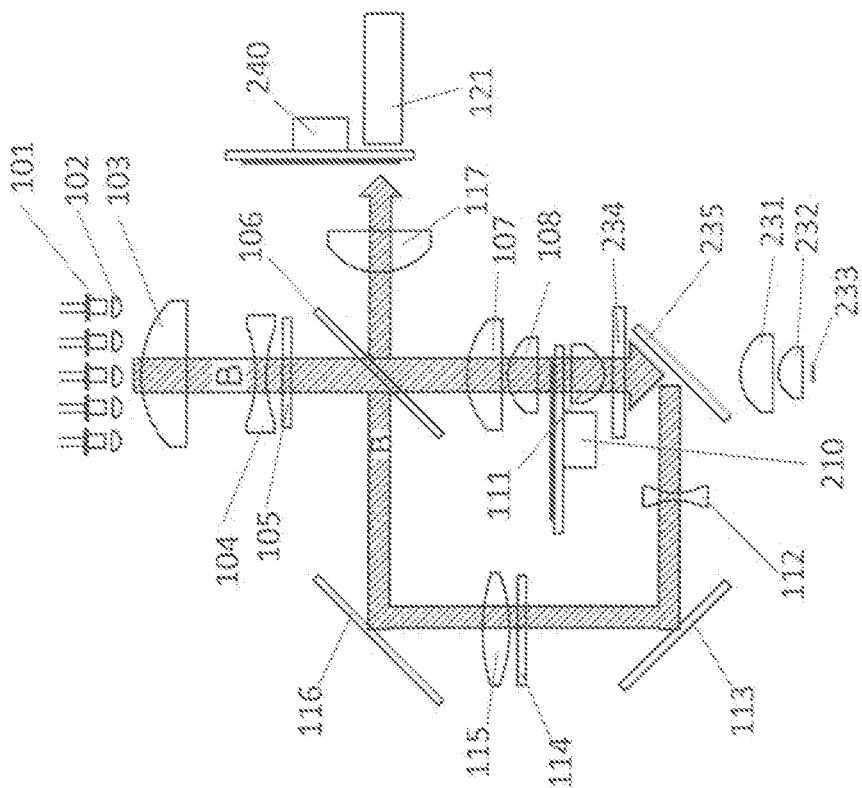
FIG. 20 is a schematic diagram showing a path of blue light when the spectral characteristic of blue light is improved in the projection-type image display apparatus 1D of FIG. 18.
Figure 21:
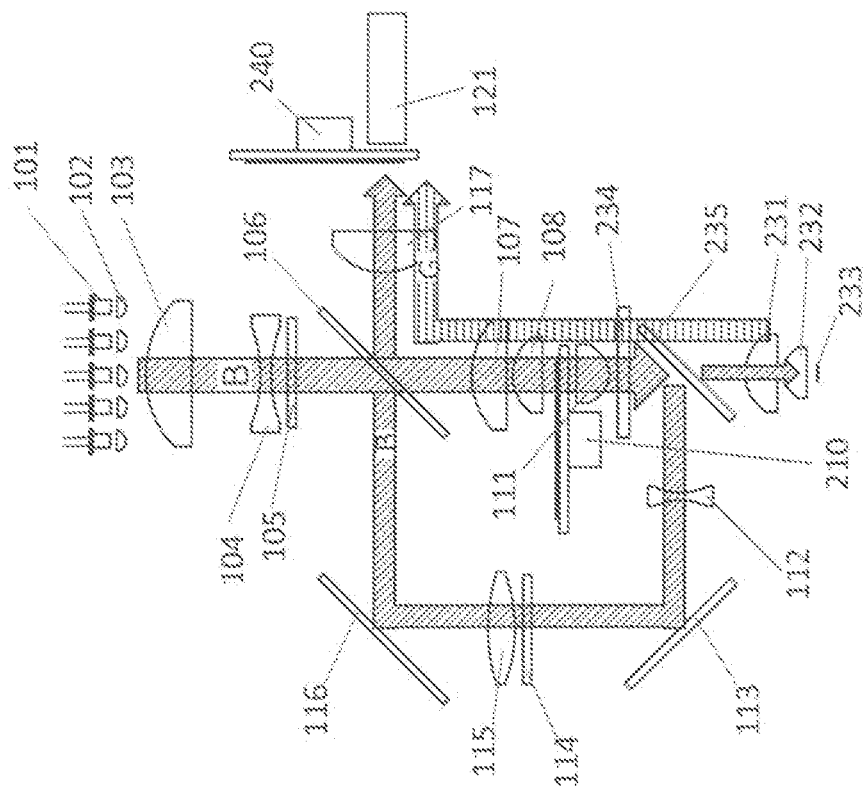
FIG. 21 is a schematic diagram showing a path of blue light when the spectral characteristic of blue light is not improved in the projection-type image display apparatus 1D of FIG. 18.

FIG. 20 is a schematic diagram showing a path of blue light when the spectral characteristic of blue light is improved in the projection-type image display apparatus 1D of FIG. 18. FIG. 21 is a schematic diagram showing a path of blue light when the spectral characteristic of blue light is not improved in the projection-type image display apparatus 1D of FIG. 18. Specifically, as shown in FIG. 21, when all the blue light incident on the polarization beam splitter 235 from the half-wave plate 234 is S-polarized, all the blue light is reflected by the polarization beam splitter 235. On the other hand, as shown in FIG. 20, when the half-wave plate 234 is rotated to mix the S-polarized blue light with the P-polarized blue light, a portion of the blue light is transmitted through the polarization beam splitter 235 and made incident on the phosphor 233 via the condenser lenses 231, 232. The green light generated by the phosphor 233 reaches the dichroic mirror 106 as in the first embodiment so that the spectral characteristic of the blue light can be improved. In this way, the polarization characteristic of the blue light transmitted through the half-wave plate 234 (the mixing ratio of S-polarized light and P-polarized light) is changed by changing the angle of the half-wave plate 234. As a result, the reflectance and the transmission ratio of the polarization beam splitter 235 is changed.

Depending on the rotation angle of the half-wave plate 234, the x-y chromaticity coordinates in the CIE1931 color space can arbitrarily be changed along the broken line of FIG. 10.

[2-3. Effects]

According to the lighting apparatus and the projection-type image display apparatus of the second embodiment, the first color component light generated by the light source is linearly polarized. The separation element includes the half-wave plate 234 rotating the polarization plane of the first color component light over a predetermined angle and the polarization beam splitter 235 partially transmitting and partially reflecting the first color component light depending on the polarization of the first color component light. The half-wave plate 234 is rotatably disposed.

As a result, by using the simple configuration and operation of rotating the half-wave plate 234, the spectral characteristic of blue light can selectively be improved with a simple configuration without requiring significant changes in configurations of the existing devices.

Other Embodiments

As described above, the embodiments have been described as exemplification of the techniques of the present disclosure. For this purpose, the accompanying drawings and detailed description are provided.

Therefore, the constituent elements described in the accompanying drawings and the detailed description may include not only the constituent elements essential for solving the problems but also the constituent elements non-essential for solving the problems so as to exemplarily describe the techniques. Thus, it should not be immediately recognized that these non-essential constituent elements are essential since these non-essential constituent elements are described in the accompanying drawings and the detailed description.

In this description, the case of improving the spectral characteristics of blue light has been described; however, the spectral characteristics of other color component lights (red light, green light, etc.) can be improved as well.

In this description, the case of using a laser diode the light source has been described; however, for example, a light-emitting diode may be used as the light source. This enables reduction in costs of the lighting apparatus and the projection-type image display apparatus when the luminance thereof is reduced.

Although the case of the linearly moving dichroic mirrors 220, 220B has been described with reference to FIGS. 5 and 14, the dichroic mirror may rotationally move around any rotation axis.

The dichroic mirrors 220, 220B and the half-wave plate 234 may be moved or rotated by hand instead of the driving device.

Since the embodiments described above are intended to exemplarily describe the techniques of the present disclosure, various modifications, replacements, additions, and omissions can be made within the claims and the scope equivalent thereto.

According to the present disclosure, a spectral characteristic of a certain color component light can be improved in a lighting apparatus and a projection-type image display apparatus without significant changes in configurations of existing devices.

What is claimed is:

1. A lighting apparatus comprising:
a light source generating a first color component light;
a separation element configured to partially transmit the first color component light, partially reflect the first color component light, and transmit a second color component light different from the first color component light at a certain moment;
an illuminant excited by the first color component light transmitted through the separation element to generate the second color component light; and
an optical system configured to combine the first color component light made incident on the separation element from the light source and reflected by the separation element with the second color component light made incident on the separation element from the illuminant and transmitted through the separation element, wherein
the separation element is configured to have variable transmittance and reflectance with respect to the first color component light, and
the first color component light generated by the light source is linearly polarized,
the separation element includes
a half-wave plate rotatably disposed, the half-wave plate rotating a polarization plane of the first color component light over a predetermined angle, and
a polarization beam splitter configured to partially transmit and partially reflect the first color component light depending on polarization of the first color component light.

2. The lighting apparatus according to claim 1, wherein the first color component light is a blue light, and the second color component light is a color component light including a green range.

3. The lighting apparatus according to claim 2, wherein the separation element reflects a color component light having a wavelength longer than a wavelength in the green range of the second color component light.

4. The lighting apparatus according to claim 1, wherein the light source is a solid-state light source element.

5. The lighting apparatus according to claim 1, wherein the lighting apparatus further includes a first phosphor wheel device including a slit over a predetermined angular range,
the first color component light is incident on the separation element from the light source through the slit, and
the optical system combines the first color component light reflected by the separation element with the second color component light transmitted through the separation element and passing through the slit.

6. A projection-type image display apparatus comprising: the lighting apparatus according to claim 1.

* * * * *